United States Patent [19]

Chavez

[11] Patent Number: 4,971,501
[45] Date of Patent: Nov. 20, 1990

[54] SELF-LOCKING, RELEASABLE LOCK NUT

[75] Inventor: Alex B. Chavez, Loma Linda, Calif.

[73] Assignee: Hi-Shear Corporation, Torrance, Calif.

[21] Appl. No.: 590,177

[22] Filed: Mar. 16, 1984

[51] Int. Cl.$^5$ .............................................. F16B 39/04
[52] U.S. Cl. .................................... 411/221; 411/326; 411/330
[58] Field of Search ............... 411/221, 220, 222, 533, 411/544, 123, 96, 100, 108, 109, 132, 136, 137, 138, 150, 217, 149, 146, 326, 145, 144, 327, 329, 330, 331; 81/176.1, 176.15, 176.2

[56] References Cited

U.S. PATENT DOCUMENTS

| 292,513 | 1/1884 | Shailer | 411/964 X |
|---|---|---|---|
| 588,346 | 8/1897 | Mireault | 411/330 |
| 666,065 | 1/1901 | Oliver | 411/326 |
| 829,407 | 8/1906 | Long | 411/964 X |
| 907,473 | 12/1908 | Tray | 411/145 |
| 1,403,902 | 1/1922 | Fields | 411/330 |
| 1,509,948 | 9/1924 | Hall | 411/145 |
| 1,527,915 | 2/1925 | Phelan | 411/136 |
| 1,882,462 | 10/1932 | Weber | 411/427 X |
| 2,251,560 | 8/1941 | White | 411/144 |
| 2,966,187 | 12/1960 | Ter Cock | 411/330 |
| 3,556,570 | 1/1971 | Cosenza | 411/544 |
| 3,705,524 | 12/1972 | Greenwood | 81/121 R |
| 4,034,788 | 7/1977 | Melone | 411/144 X |
| 4,191,236 | 3/1980 | Duram | 411/326 X |

FOREIGN PATENT DOCUMENTS

| 231945 | 3/1911 | Fed. Rep. of Germany | 411/145 |
|---|---|---|---|
| 2664 | 3/1954 | Fed. Rep. of Germany | 411/427 |
| 29609 | of 0000 | Switzerland | 411/327 |
| 245121 | 6/1926 | United Kingdom | 411/330 |
| 523403 | 7/1940 | United Kingdom | 411/223 |

Primary Examiner—Rodney M. Lindsey
Attorney, Agent, or Firm—Donald D. Mon

[57] ABSTRACT

A self-locking lock nut to be applied to a shaft having an axial keyway. It can be applied and removed with or without special tooling by virtue of a camming relationship between the teeth of a rotationally restrained axially biased lock ring, and the teeth of a rotatable nut ring that is threaded to the shaft, and which bears against a thrust washer to which the lock ring is retained.

7 Claims, 2 Drawing Sheets

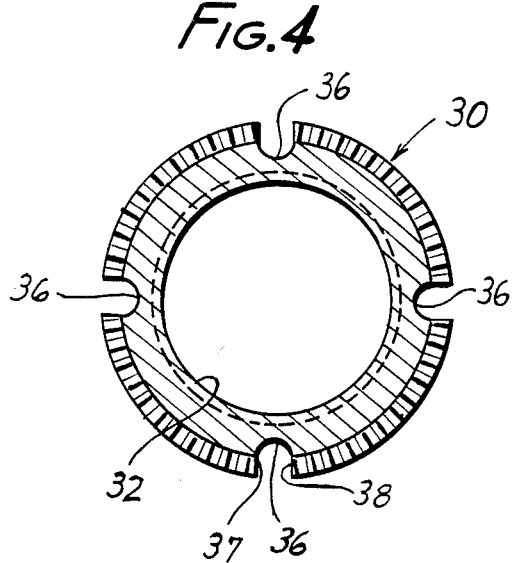
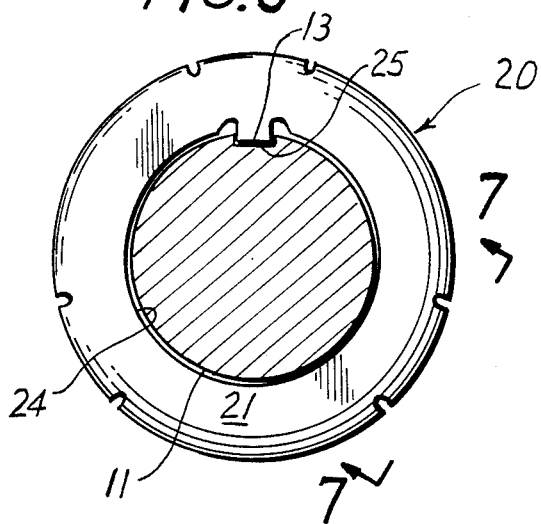
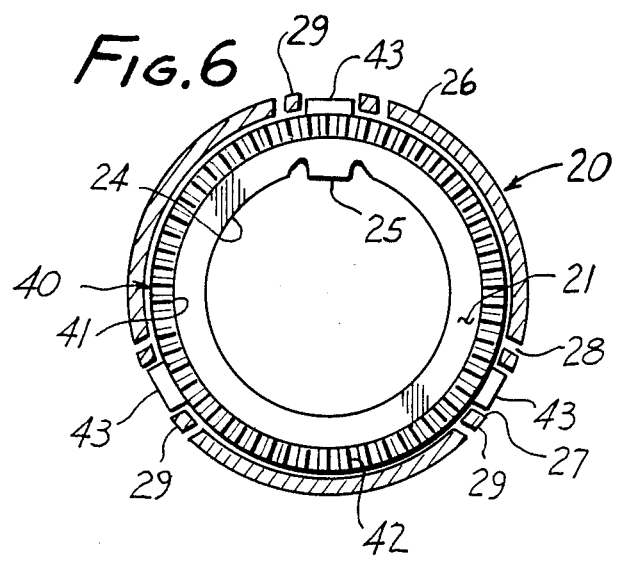
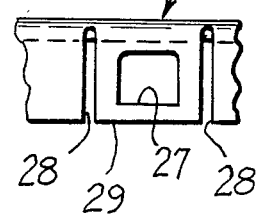
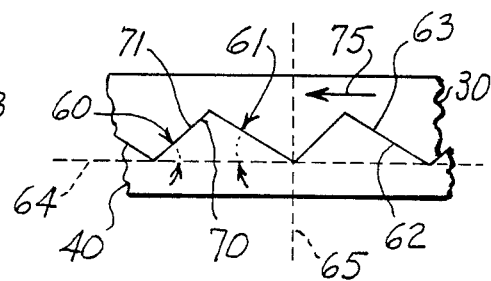

SELF-LOCKING, RELEASABLE LOCK NUT

FIELD OF THE INVENTION

This invention relates to self-locking releasable lock nuts of the type which are useful on shafts and spindles, for example to hold wheel bearings onto a spindle with a correct axial load.

BACKGROUND OF THE INVENTION

Lock nuts which can be threaded onto a keyed spindle and locked into an adjusted position are well known. Among the best known applications is the wheel bearing nut which is tightened to a given result such as a light drag, and is then locked in place. Conventional nuts are usually tightened, and then backed off to the next suitable alignment position for a cotter key. However, they are not self-locking, and depend for their locking action upon the cotter key. Without the cotter key, the nut can vibrate loose. If the cotter key fails, the nut can come loose.

To overcome the disadvantages of such conventional nuts, efforts have been made to provide nuts which after being tightened have locking elements which must be released before the nut can be turned off the shaft. Examples of such nuts are Greenwood U.S. Pat. Nos. 3,581,609 and 3,705,524; and Wing U.S. Pat. Nos. 3,851,690 and 3,942,570.

The efforts to overcome the disadvantages of the cotter-keyed nuts have themselves involved problems that have retarded the acceptance of a good idea. Among the problems is the need always to have a special tool whenever the nut is to be loosened or tightened. Field repairs without the tool are not feasible, and this is a definite disadvantage. A nut according to this invention can be tightened down or loosened with any torque tool which can engage it, but it is held against loosening, unless a sufficient torque is directly applied to a specific part of the nut, which can be done with many types of field tools. This specific part is held against loosening except by those direct forces.

Another object of this invention is to provide a lock nut assembly which, while it is readily assembled, thereafter is an inseparable assembly, which precludes the possibilities of omitting parts, or of misorienting separable parts.

An optional object of the invention is to provide a lock nut which is easier to tighten than to release, thereby improving the self-locking feature of the device.

BRIEF DESCRIPTION OF THE INVENTION

A lock nut according to this invention includes a thrust washer having a disc with a central axis, a central aperture to pass a shaft, spindle or bolt (generally referred to as "shaft"), a tongue for engagement in an axial groove in the shaft, and a peripheral skirt extending from the disc. The skirt includes an axially extending keyway. Inside the skirt there are contained a nut ring and a lock ring, which are coaxial. The lock ring is disposed between the disc and a part of the nut ring, and a bias spring is disposed between the lock ring and the disc, biasing the lock ring toward the nut ring. The nut ring bears an internal thread to be engaged on the shaft. The lock ring carries a key which rides in the keyway so it cannot rotate relative to the thrust washer, but it can move axially against the bias ring. The nut ring and lock ring carry complementary teeth which face each other. They engage one another except when the lock ring is pushed axially away from the nut ring against the bias spring. The nut ring carries torque tool engaging means, such as a recess into which a tang can be inserted for turning the nut ring, and if desired, also for displacing (unlocking) the lock ring.

BRIEF DESCRIPTION OF THE DRAWINGS

FIGS. 4 and 5 are cross-sections taken at lines 4—4 and 5—5, respectively in FIG. 1;

FIG. 6 is a cross-section taken at line 6—6 in FIG. 3;

FIG. 7 is a fragmentary side view taken at line 7—7 in FIG. 5; and

FIG. 8 is a schematic illustration of a feature of the invention.

DETAILED DESCRIPTION OF THE INVENTION

Figure 1:
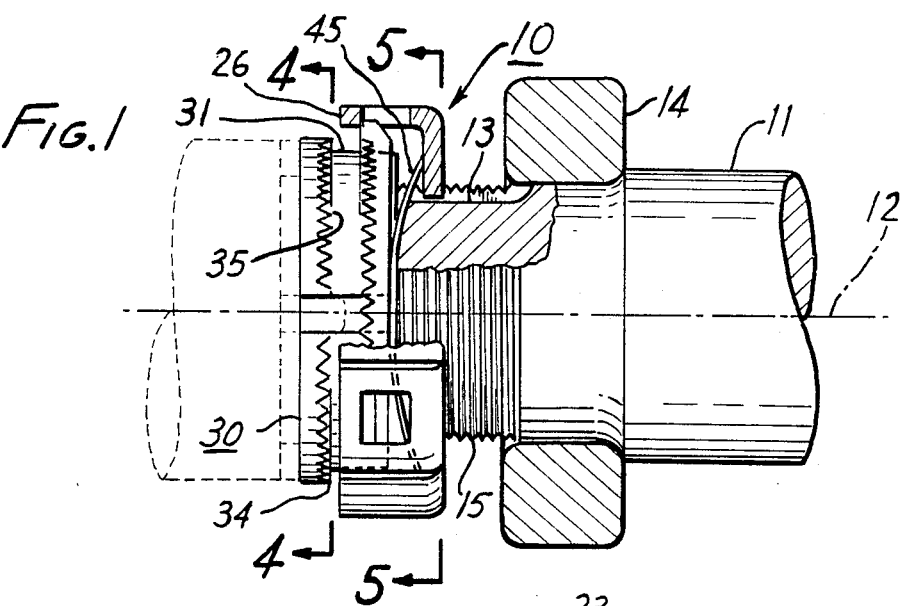
FIGS. 1, 2 and 3 are axial views partly in cut-away cross-section.

Wherever the term "shaft" is used herein it means any other elongated threaded body such as a bolt or shaft, as well as a spindle. A wheel axle spindle is shown as the presently best-known use of this invention, and is encompassed by the term "shaft" herein. The shaft has an external thread 15 on which the lock nut is to be threaded and locked.

Lock nut 10 has a central axis coaxial with axis 12 and includes a thrust washer 20. The thrust washer has a central disc portion 21 which is flat, with a face 22 adapted to bear against ring 14 and an inner face 23 which will react with another portion of the lock nut as will later be appreciated. The disc portion has a central aperture 24, through which the shaft is to pass. A tang 25 is integral with the disc portion and projects into the opening in order to enter the shaft keyway so as to hold the thrust washer against rotation relative to the shaft. A peripheral skirt 26 is integral with the disc and extends upwardly and axially away from it. Three axially extending skirt keyways 27 are formed in the skirt and this formation is enabled by a group of slits 28 which facilitate the formation of the thrust washer by stamping from a single piece of metal. The slits form tabs 29 in which the keyways are formed. These tabs are a convenience in assembling the lock nut, because they can spring over tangs on a lock ring to be described, and this forms the lock nut as an integral assembly.

Inside the skirt there is a nut ring 30 which has a central neck 31 that extends axially and has an internal thread 32 to thread onto the thread on the shaft. The nut ring extends to a bearing face 33 which bears against inner face 23 of the thrust washers so as to transmit thrust against it. The nut ring also has an overhanging shoulder 34 which has on its surface facing toward disc portion, a plurality of teeth 35. Also, there is a plurality of recesses 36 which pass through the shoulder and expose a portion of the mechanism yet to be described. These are torque tool engaging recesses which have edges 37 and 38 that are adapted to receive torque from the tool to turn the nut ring.

Between the nut ring and the disc portion, or more specifically between the overhanging (shoulder) and the disc portion, there is disposed a lock ring 40. The lock ring has an internal opening 41 which is shorter than that of the outer portion of the neck. The lock ring includes a plurality of teeth 42 which face toward teeth 35 and are complementary therewith. The lock ring also includes three tangs 43 which extend into respective ones of the skirt keyways to restrain the lock ring against substantial rotation, but which permit substantial axial movement of the lock ring.

Bias spring 45, preferably in the form of a circular wave spring, extends around the neck and bears between the disc portion and the lock ring so as to bias the lock ring toward and against the overhanging shoulder of the nut ring.

The shape of teeth 35 and 42 is of importance to this invention. In all embodiments, the teeth have camming surfaces 46 and 47 which extend in each direction, and meet at an apex. The apex can be flat, sharp, or gently crested, chosen with respect to the material of construction so that they will not be locking surfaces, and provide a desired resistance to camming. This is to say that they do not fall within the locking angle of the material, but are such as to allow camming action, still with sufficient locking action. This means that with sufficient torque applied to the nut ring the surfaces 46 and 47 will ride over one another, and because the nut ring is engaged to a thread, the result will be to displace the lock ring against the bias force and permit the lock ring either to cam itself on or off the nut ring, even without the application of an axial force from the torque tool. This enables the lock nut to be applied and removed with or without a special tool. However, it is best practice to utilize a tool, especially in shop or manufacturing operations.

Figure 2:
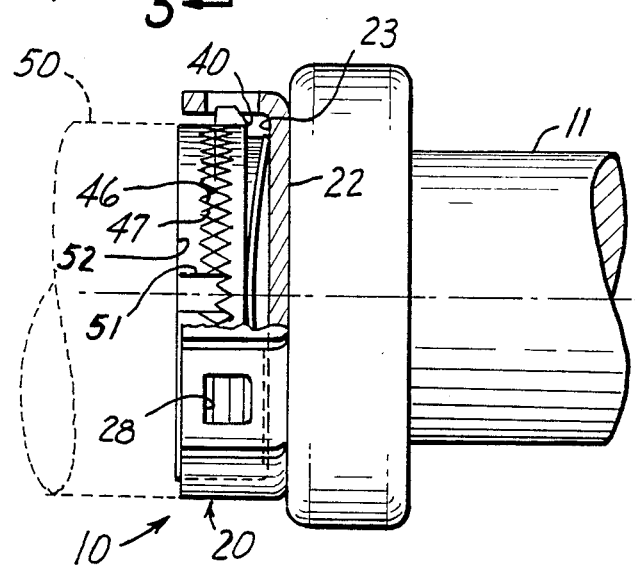

Such a tool 50 is shown in FIGS. 1 and 2. It is preferably tubular, and includes four prongs 51, which are adapted to be inserted into recesses 36. The width of recesses 36 and the width of the prongs is such that the prongs can bridge at least a plurality of the teeth so that at any angular position, at least one tooth will always be borne against by a respective prong. Accordingly, when the tool is used, its shoulder 52 will be pressed against the lock nut and its prongs against the tips of teeth of the locking ring so as to displace it, and the nut ring can be installed or removed without requiring a camming action to occur. The teeth will simply clear each other by virtue of the applied force from the tool.

While the teeth may be symmetrical, with both faces making the same angle with an axial reference, important advantages can be obtained if they are different. In FIG. 8, the preferred embodiment is shown. Torquing faces 62, 63 on parts 30 and 40, respectively form an angle 61 with a tangent 64 to an axial line 65. Unlocking faces 70, 71 are formed on parts 30 and 40, respectively. These form an angle 60 between such a tangent and axial line. These are shown for a right hand thread nut whose direction of tightening is shown by arrow 75. Angle 60 is larger than angle 61. An example is 45° and 30°, respectively.

If nut ring 30 is to back off, its camming angle at faces 70 and 71 is steeper, and this makes unlocking more difficult than tightening, because the camming angle is lesser for torquing.

Figure 3:
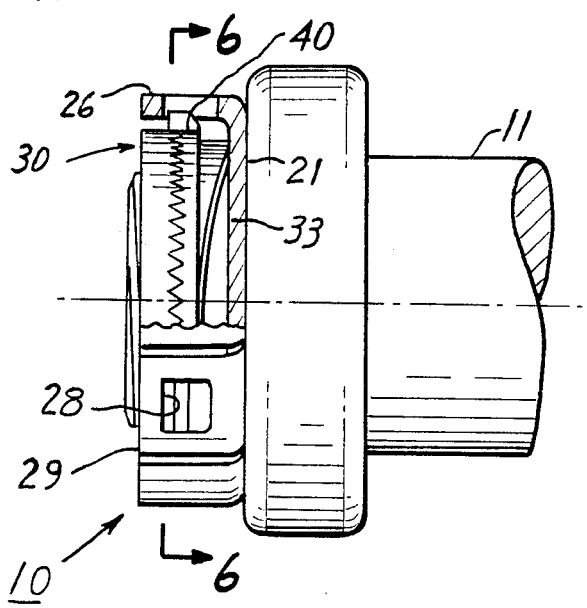

It is believed that the operation of the device will be evident from the foregoing. As best shown in FIG. 1, the nut is applied to the shaft and turned down with or without the use of the tool. When the final tightening occurs, the tool will be pressed in as shown in FIG. 2, so as to displace the lock ring and enable the tightening to occur without having to have a camming action. The nut ring will bear against the disc portion to transmit the axial force from the thread interaction. Then as shown in FIG. 3 the tool is withdrawn, and the nut ring will, if necessary, cam itself back to the intimate complementary engagement shown in FIG. 3. Reversal may be the reverse of the foregoing or may be accomplished simply by applying any torque tool which need not displace the lock ring and simply turning the nut off while camming the rings apart by virtue of the shape of the teeth.

The face of the teeth usually will be flat, but need not be. They could instead be wave-like. If the nut uses a left-hand thread, the orientation of the torquing and unlocking faces will be reversed.

This invention is not to be limited to the embodiments shown in the drawings and described in the description, which are given by way of example and not of limitation, but only in accordance with the scope of the appended claims.

I claim:

1. A lock nut for being threaded onto, and retaining itself to a shaft having a keyway, said lock nut having a central axis and comprising:

a thrust washer having a disc portion, a central opening through said disc portion to pass said shaft, a tongue extending into said opening to enter the shaft keyway, and a peripheral skirt extending axially away from the disc, said skirt having formed therein an axially extending skirt keyway;

a nut ring having a central aperture bounded by an internal wall, and a thread on said wall, teeth on one end of said nut ring, and torque tool engaging means accessible to a torque tool from the opposite end of said nut ring, the axial length of said nut ring being such as always to be esntactible with said disc portion;

a lock ring having a central aperture, teeth on one end of said lock ring, said teeth being complementary to the teeth on said nut ring, and a lock ring tang so disposed and arranged as to project into said skirt keyway to resist rotation of said lock ring, but to enable the lock ring always to move axially in said skirt toward said disc portion when said lock nut is fully tightened, the length of said lock ring being such that said lock ring always can move axially toward said disc portion when said lock nut is fully tightened, whereby the lock nut can always be enabled to be unlocked by axial separation of the teeth of the nut ring and the lock ring;

bias means axially biasing said lock ring toward said nut ring so as to interengage said teeth, said teeth being so proportioned and arranged that they cam the rings apart upon exertion of sufficient torque;

a neck carrying said thread which telescopically enters the aperture in the lock ring, in which the teeth on said nut ring are carried on a shoulder which overhangs the lock ring, and in which an end of said neck contacts the disc portion when the lock nut is tightened.

2. A lock nut according to claim 1 in which said teeth are complementary, but asymmetrical, the angle formed relative to a tangent in a plane normal to said axis being lesser for faces of said teeth which transmit setting torque to said lock nut than for faces which transmit unlocking torque.

3. A lock nut according to claim 2 in which said bias means is a circular wave spring.

4. A combination according to claim 1 in which said teeth are complementary, but asymmetrical.

5. A lock nut according to claim 1 in which said teeth have symmetrical faces.

6. A lock nut according to claim 5 in which said torque tool engaging means comprises an aperture in said shoulder on said nut ring.

7. A lock nut according to claim 6 in which said aperture gives access to a plurality of said teeth on said lock ring.

* * * * *